(12) United States Patent
Nakano

(10) Patent No.: US 10,594,392 B2
(45) Date of Patent: Mar. 17, 2020

(54) OPTICAL TRANSMITTER, OPTICAL TRANSMISSION DEVICE, OPTICAL TRANSMISSION/RECEPTION SYSTEM, AND OPTICAL TRANSMISSION METHOD

(71) Applicant: NEC CORPORATION, Tokyo (JP)

(72) Inventor: Takehiro Nakano, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/747,179

(22) PCT Filed: Aug. 1, 2016

(86) PCT No.: PCT/JP2016/003533
§ 371 (c)(1),
(2) Date: Jan. 24, 2018

(87) PCT Pub. No.: WO2017/022232
PCT Pub. Date: Feb. 9, 2017

(65) Prior Publication Data
US 2018/0219617 A1  Aug. 2, 2018

(30) Foreign Application Priority Data
Aug. 6, 2015  (JP) .................................. 2015-155883

(51) Int. Cl.
*H04B 10/03* (2013.01)
*H04B 10/516* (2013.01)
(Continued)

(52) U.S. Cl.
CPC ............. *H04B 10/03* (2013.01); *H04B 10/25* (2013.01); *H04B 10/516* (2013.01); *H04J 14/06* (2013.01)

(58) Field of Classification Search
CPC ...... H04B 10/03; H04B 10/25; H04B 10/516; H04J 14/06
(Continued)

(56) References Cited

U.S. PATENT DOCUMENTS 7,340,163 B2 *  3/2008  Hardee ..................... H04J 3/14
                                                    398/10
2009/0290870 A1 * 11/2009  Koyano ........... H04B 10/07955
                                                    398/25

(Continued)

FOREIGN PATENT DOCUMENTS

CN   103460612 A   12/2013
CN   104378165 A   2/2015
(Continued)

OTHER PUBLICATIONS

Communication dated Jul. 17, 2018 from the European Patent Office in counterpart application No. 16832515.7.
(Continued)

*Primary Examiner* — Amritbir K Sandhu
(74) *Attorney, Agent, or Firm* — Sughrue Mion, PLLC

(57) ABSTRACT

To enable the transmission and reception of a super-channel optical signal to continue maintaining the possible transmission capacity without providing a redundant configuration in advance even though a failure occurs in a subcarrier, an optical transmitter 10 of the present invention includes a splitting means 20 for splitting an inputted client signal so as to make frequency efficiency in optical modulation means optimized; optical modulation means 31 to 3N for modulating one of subcarriers having mutually different wavelengths with the client signal output; a multiplexing means 40 for multiplexing the modulated signals and outputting a super-channel optical signal; and a control means 50, in a state where a failure occurs in one of the subcarriers, for making a split client signal output to modulation means
(Continued)

corresponding to a subcarrier having no failure and applying a modulation method with a higher frequency efficiency to at least one of the modulation means.

15 Claims, 11 Drawing Sheets

(51) Int. Cl.
  *H04B 10/25* (2013.01)
  *H04J 14/06* (2006.01)

(58) Field of Classification Search
  USPC .................................................. 398/140–172
  See application file for complete search history.

(56) References Cited

U.S. PATENT DOCUMENTS

| | | | | |
|---|---|---|---|---|
| 2010/0183294 | A1* | 7/2010 | Villarruel | H04B 10/032 398/10 |
| 2010/0183309 | A1* | 7/2010 | Etemad | H04B 10/505 398/79 |
| 2011/0176815 | A1* | 7/2011 | Frankel | H04B 10/5053 398/184 |
| 2012/0177384 | A1* | 7/2012 | Ryf | H04B 10/2581 398/202 |
| 2013/0236168 | A1* | 9/2013 | Matsui | H04B 10/032 398/2 |
| 2014/0140692 | A1 | 5/2014 | Oda et al. | |
| 2016/0080087 | A1* | 3/2016 | Koike-Akino | H04B 10/516 398/79 |
| 2016/0112118 | A1* | 4/2016 | Rahn | H04B 10/032 398/5 |
| 2017/0033885 | A1* | 2/2017 | Cavaliere | H04B 10/25759 |
| 2018/0006722 | A1* | 1/2018 | Ngo | H04B 10/071 |
| 2018/0219617 | A1* | 8/2018 | Nakano | H04B 10/03 |

FOREIGN PATENT DOCUMENTS

| | | |
|---|---|---|
| EP | 2800289 A2 | 11/2014 |
| JP | 2011-250291 A | 12/2011 |
| JP | 2013-187632 A | 9/2013 |
| JP | 2014-103600 A | 6/2014 |
| JP | 2014-220575 A | 11/2014 |
| JP | 2016213539 A | 12/2016 |
| WO | 2013/114629 A1 | 5/2015 |
| WO | 2013/125621 A1 | 7/2015 |

OTHER PUBLICATIONS

International Search Report for PCT/JP2016/003533 dated Sep. 13, 2016.
Communication dated Oct. 23, 2018, from Japanese Patent Office in counterpart application No. 2017-532377.
Communication dated Oct. 30, 2019 issued by the China National Intellectual Property Administration in counterpart application No. 201680045911.3.

* cited by examiner

OPTICAL TRANSMITTER, OPTICAL TRANSMISSION DEVICE, OPTICAL TRANSMISSION/RECEPTION SYSTEM, AND OPTICAL TRANSMISSION METHOD

CROSS REFERENCE TO RELATED APPLICATIONS

This application is a National Stage of International Application No. PCT/JP2016/003533 filed Aug. 1, 2016, claiming priority based on Japanese Patent Application No. 2015-155883 filed Aug. 6, 2015, the contents of all of which are incorporated herein by reference in their entirety.

TECHNICAL FIELD

The present invention relates to optical transmitters, optical transmission devices, optical transmission/reception systems, and optical transmission methods and, in particular, to an optical transmitter, an optical transmission device, an optical transmission/reception system, and an optical transmission method that transmit or receive a super-channel optical signal.

BACKGROUND ART

With the recent increase in demand for data communication services, there have been introduced high-density, large-capacity optical fiber communication systems such as a polarization multiplexing method in which optical signals are multiplexed by means of optical carrier waves whose polarizations are orthogonal to each other, a digital coherent optical transmission method, and a super-channel method.

In the digital coherent optical transmission/reception method, the transmission rate can be increased by changing a multi-level degree of the modulation applying modulation methods such as BPSK (Binary Phase Shift Keying), QPSK (Quadrature Phase Shift Keying), 16QAM (Quadrature Amplitude Modulation), and 64QAM. In the super-channel method in which a plurality of subcarriers are multiplexed, the transmission rate can be increased by changing the number of subcarriers.

Here, in the super-channel method, in order to generate a plurality of subcarriers, it is required to provide as many components such as a light source, an optical modulation unit, and a digital coherent receiver as the subcarriers. The risk of failure occurrence increases with the number of the components increasing, and, if a failure occurs in a subcarrier in the super-channel optical signal transmission that is constituted by the plurality of subcarriers, the possible transmission capacity of the super-channel optical signal decreases by the capacity of the subcarrier in which the failure occurs, and it can become impossible to restore client signals to be accommodated in an optical transmitter/receiver.

To the problem that it becomes impossible to restore frames if a failure occurs at a part of lanes in multi-lane transfer, Patent Literature 1 discloses a multi-lane transfer system that performs a fallback in which a lane number subjected to the failure is excluded and performs protection using an unused lane. In the multi-lane transfer system, the fallback and the protection are performed by defining a region for a fault lane notification bit in an inserted multi-lane transfer function extension block and notifying from a receiver to a transmitter the lane number of a virtual lane subjected to a failure.

CITATION LIST

Patent Literature

[PTL 1] WO 2013/125621

SUMMARY OF INVENTION

Technical Problem

However, if the fallback is performed excluding a lane number subjected to a failure, the possible transmission capacity of the super-channel optical signal decreases. In contrast, if an unused lane is provided in advance to deal with a case of failure, it is necessary to prepare excess components such as a light source, an optical modulation unit, and a digital coherent receiver, which results in a higher cost.

The present invention has been made taking the above-described problems into consideration, and the object is to provide an optical transmitter, an optical transmission device, an optical transmission/reception system, and an optical transmission method that enable the transmission and reception of a super-channel optical signal to continue maintaining the possible transmission capacity without providing a redundant configuration in advance even though a failure occurs in a subcarrier.

Solution to Problem

To achieve the above-described object, an optical transmitter according to an exemplary aspect of the present invention includes a splitting means for splitting an inputted client signal depending on a control signal so as to make frequency efficiency in N pieces of optical modulation means optimized, and outputting split client signals; N pieces of optical modulation means for modulating one of subcarriers having mutually different wavelengths with the client signal output by one of a first modulation method and a second modulation method with a higher frequency efficiency than the first modulation method, and outputting one of a first modulated signal and a second modulated signal; a multiplexing means for multiplexing one of the first modulated signal and the second modulated signal having been output, and outputting a super-channel optical signal; and a control means for generating and outputting, in a normal state, a control signal for making the client signal split into N pieces and outputting split signals to the N pieces of optical modulation means, and applying the first modulation method to the N pieces of modulation means, and in a state where a failure occurs in one of the subcarriers, a control signal for making the client signal split and the split signal output to modulation means corresponding to a subcarrier having no failure, and applying the second modulation method to at least one of the modulation means corresponding to a subcarrier having no failure.

To achieve the above-described object, an optical transmission device according to an exemplary aspect of the present invention includes a plurality of optical transmitters, each of which described above; and an optical multiplexer configured to multiplex super-channel optical signals output from the plurality of optical transmitters and transmit a wavelength-multiplexed optical signal.

To achieve the above-described object, an optical transmission/reception system according to an exemplary aspect of the present invention includes the above-described optical transmission device configured to transmit the wavelength-multiplexed optical signal; and an optical reception device configured to receive the wavelength-multiplexed optical signal, on which to perform digital coherent processing, and restore and output a plurality of client signals.

To achieve the above-described object, an optical transmission method according to an exemplary aspect of the present invention, using N pieces of optical modulation means for modulating one of subcarriers having mutually different wavelengths with an inputted client signal by one of a first modulation method and a second modulation method with a higher frequency efficiency than the first modulation method, and outputting one of a first modulated signal and a second modulated signal, the optical transmission method including: in a normal state, splitting the inputted client signal into N pieces of signals and outputting the signals to the N pieces of optical modulation means respectively; outputting the first modulated signal from each of the N pieces of optical modulation means; and multiplexing N pieces of first modulated signals having been output and outputting a super-channel optical signal; and in a state where a failure occurs in one of the subcarriers, splitting the inputted client signal so that frequency efficiency of the optical modulation means may be optimized and outputting a split client signal to an optical modulation means corresponding to a subcarrier having no failure; outputting the second modulated signal from at least one of the optical modulation means having received input of the client signal; outputting the first modulated signals from remaining optical modulation means having received input of the client signal; and multiplexing the first modulated signal and the second modulated signal having been output, and outputting a super-channel optical signal.

Advantageous Effects of Invention

According to the above-described aspects of the present invention, it is possible to continue the transmission and reception of a super-channel optical signal maintaining the possible transmission capacity without providing a redundant configuration in advance even though a failure occurs in a subcarrier.

DESCRIPTION OF EMBODIMENTS

<First Example Embodiment>

Figure 1:
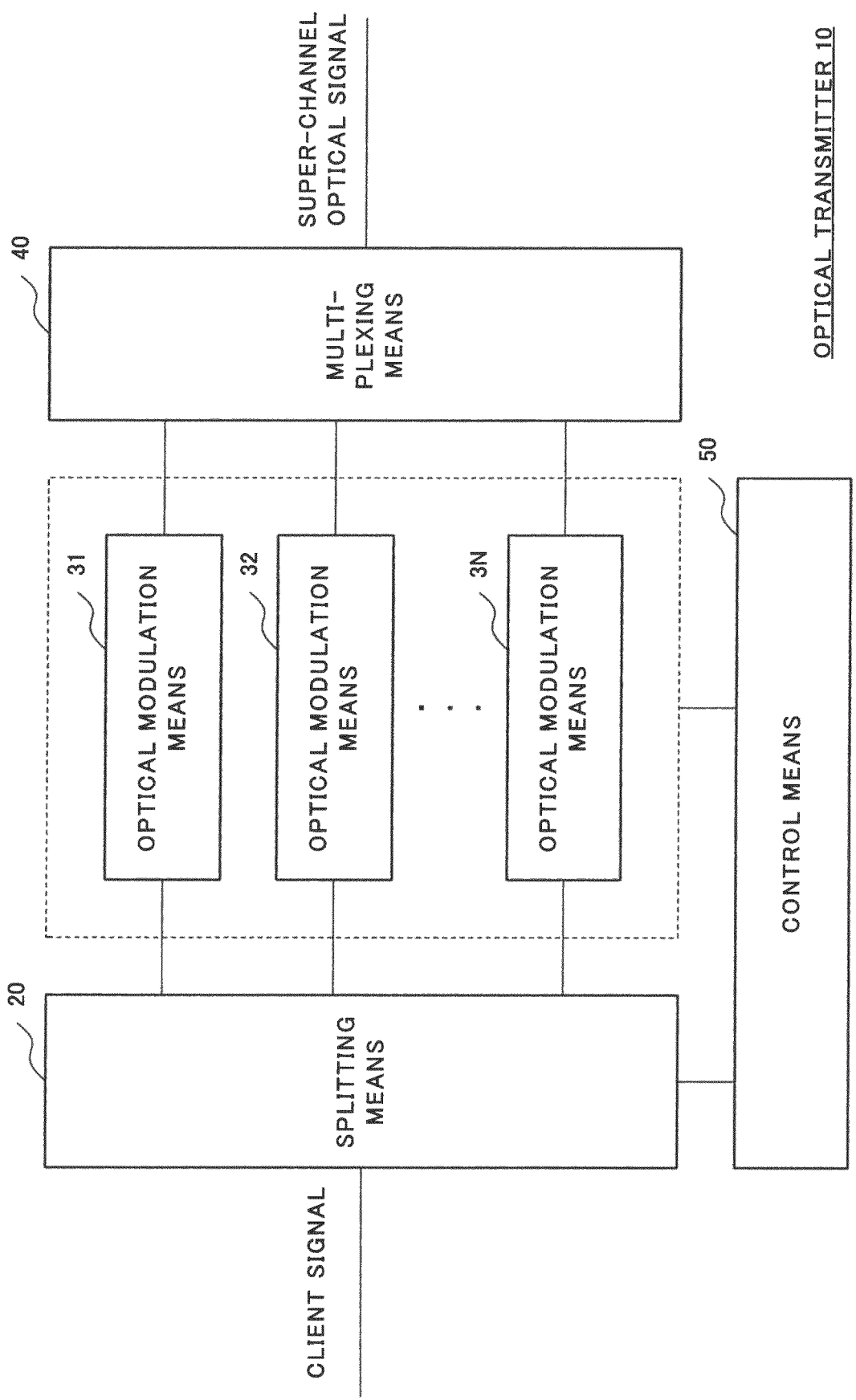
FIG. 1 is a block configuration diagram of an optical transmitter 10 according to a first example embodiment.

A first example embodiment of the present invention will be described below. FIG. 1 illustrates a block configuration diagram of an optical transmitter according to the present example embodiment. In FIG. 1, an optical transmitter 10 includes a splitting means 20, N pieces of optical modulation means 31 to 3N, a multiplexing means 40, and a control means 50.

The splitting means 20 splits a client signal inputted into it depending on a control signal inputted from the control means 50 and outputs the split client signals to the optical modulation means 31 to 3N. The splitting means 20 according to the present example embodiment distributes the client signal among the optical modulation means 31 to 3N so that the frequency efficiency in the optical modulation means 31 to 3N may be maximized.

Each of the optical modulation means 31 to 3N obtains a subcarrier whose wavelength differs from each other, and one of a first modulation method and a second modulation method with a higher frequency efficiency than that of the first modulation method is set by a control signal inputted from the control means 50. Each of the optical modulation means 31 to 3N modulates the obtained subcarrier with the inputted client signal by the set modulation method, and outputs a first modulated signal or a second modulated signal.

The multiplexing means 40 multiplexes the first or second modulated signals output from the optical modulation means 31 to 3N, and outputs a super-channel optical signal.

The control means 50 generates a control signal to control the splitting means 20 and the optical modulation means 31 to 3N, and outputs the control signals to the splitting means 20 and the optical modulation means 31 to 3N. In a normal state, the control means 50 generates a control signal that causes the splitting means to split the inputted client signal into N pieces and output the split signals to the optical modulation means 31 to 3N, and that causes every one of the optical modulation means 31 to 3N to set the first modulation method. In contrast, if a failure occurs in one of the subcarriers, the control means 50 outputs, to the splitting means 20, a control signal that causes the splitting means 20 to split the client signal and output the split signals so that no client signal is inputted into an optical modulation means corresponding to the subcarrier in which the failure occurs. In addition, the control means 50 outputs, to the optical modulation means 31 to 3N, control signals by which to set the second modulation method in at least one of the optical modulation means into which the client signal is to be inputted, and set the first modulation method in the remainder.

For example, a description will be given below of a case where Nx50G client signals are inputted into the optical transmitter 10, the optical modulation means 31 to 3N obtain subcarriers whose center frequencies are respectively a first wavelength, a second wavelength, . . . , and an N-th wavelength, the first modulation method is a BPSK modulation method, and the second modulation method is a QPSK modulation method.

In that case, the control means 50 generates a control signal that causes the Nx50G client signals to be split into N pieces so as to maximize the frequency efficiency in the optical modulation means 31 to 3N and the split signals to be output to the optical modulation means 31 to 3N, and that causes the BPSK modulation method to be set in the optical modulation means 31 to 3N. This makes the splitting means 20 output a 50G client signal to each of the optical modulation means 31 to 3N. Each of the optical modulation means 31 to 3N BPSK-modulates the subcarrier with the inputted 50G client signal and outputs a BPSK-modulated signal. Then the multiplexing means 40 multiplexes the BPSK-modulated 50G signals output from the optical modulation means 31 to 3N, and outputs an Nx50G super-channel optical signal.

On the other hand, if a failure occurs in a subcarrier with L-th wavelength (1≤L≤N), the control means 50 causes the splitting means to split the Nx50G client signals into N−1 pieces so as to maximize the frequency efficiency in the optical modulation means 31 to 3N, and output the split signals to the optical modulation means 31 to 3(L−1) and 3(L+1) to 3N not involving the optical modulation means 3L corresponding to the L-th wavelength subcarrier. In addition, the control means 50 causes the optical modulation means 3L to stop the output, sets the second modulation method in the optical modulation means 3(L−1) with an adjacent wavelength band, and sets the first modulation method in the remaining optical modulation means 31 to 3(L−2) and 3(L+1) to 3N. Here, a modulation means in which the second modulation method is set may be one other than the adjacent optical modulation means 3(L−1).

Accordingly, the splitting means 20 splits the Nx50G client signals into 50G×(N−2) signals and a 100G signal, and outputs the 50G client signals to the optical modulation means 31 to 3(L−2) and 3(L+1) to 3N, and outputs the 100G client signal to the optical modulation means 3(L−1). Then, each of the optical modulation means 31 to 3(L−2) and 3(L+1) to 3N BPSK-modulates a subcarrier with the inputted 50G client signal and outputs a 50G BPSK-modulated signal, and the optical modulation means 3(L−1) QPSK-modulates a subcarrier with the 100G client signal and outputs a 100G QPSK-modulated signal. The multiplexing means 40 multiplexes the BPSK-modulated 50G signals output from the optical modulation means 31 to 3(L−2) and 3(L+1) to 3N and the QPSK-modulated 100G signal output from the optical modulation means 3(L−1), and outputs an Nx50G super-channel optical signal. As a result, even though a failure occurs in the L-th wavelength subcarrier, it is possible to maintain the possible transmission capacity of the super-channel optical signal.

As described above, on the occurrence of a failure in any one of subcarriers, the optical transmitter 10 according to the present example embodiment sets a modulation method with a higher frequency efficiency in at least one of optical modulation means that correspond to subcarriers in which no failure occurs, and splits the client signal so as to optimize the frequency efficiency. This enables the optical transmitter 10 according to the present example embodiment to continue the transmission and reception of a super-channel optical signal maintaining the possible transmission capacity without providing a redundant configuration in advance even though a failure occurs in a subcarrier. In the present example embodiment, it has been described as an example that BPSK modulation method is applied to the first modulation method, and that QPSK modulation method is applied to the second modulation method; however, there is no limitation to that. It is only necessary to apply, to the second modulation method, a modulation method with a higher frequency efficiency than that of the first modulation method; accordingly, various modulation methods such as 8QAM, 16QAM, and 64QAM can be applied.

<Second Example Embodiment>

Figure 2:
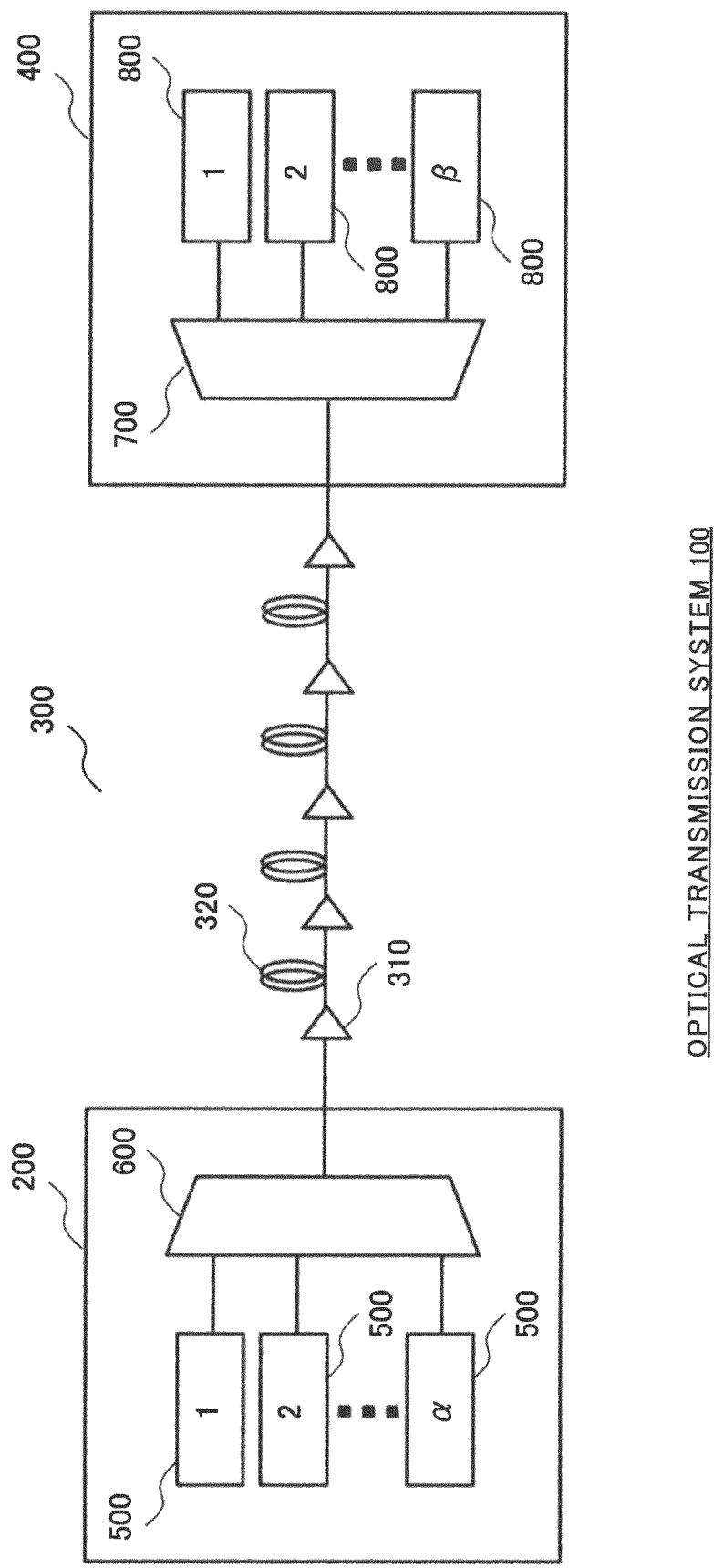
FIG. 2 is a system configuration diagram of an optical transmission system 100 according to a second example embodiment.

A second example embodiment will be described below. FIG. 2 illustrates a system block diagram of an optical transmission system according to the present example embodiment. In FIG. 2, the optical transmission system 100 is composed of an optical transmission device 200, an optical fiber transmission line 300, and an optical reception device 400. In the present example embodiment, the optical transmission device 200 and the optical reception device 400 transmit and receive a wavelength-multiplexed optical signal into which super-channel optical signals are multiplexed through the optical fiber transmission line 300 composed of a plurality of optical amplifying devices 310 and an optical cable 320. Here, the super-channel optical signal is a 400 Gbps optical signal obtained by multiplexing eight subcarrier signals each of which is a 50 Gbps DP-BPSK (dual polarization binary phase shift keying) modulation signal, for example. It is only necessary for the optical transmission system 100 according to the present example embodiment to be a system transmitting and receiving optical signals, and the optical transmission system 100 can be applied to the full range of optical fiber communication including a repeaterless transmission without the amplifying device 310, a single super-channel transmission without wavelength multiplexing, and the like.

The optical transmission device 200 includes α pieces of super-channel optical transmitters 500 and an optical multiplexer 600, generates a plurality of super-channel optical signals from client signals respectively inputted from a plurality of transmission sources, and multiplexes them and transmits multiplexed super-channel optical signals as a wavelength-multiplexed optical signal.

Figure 3:
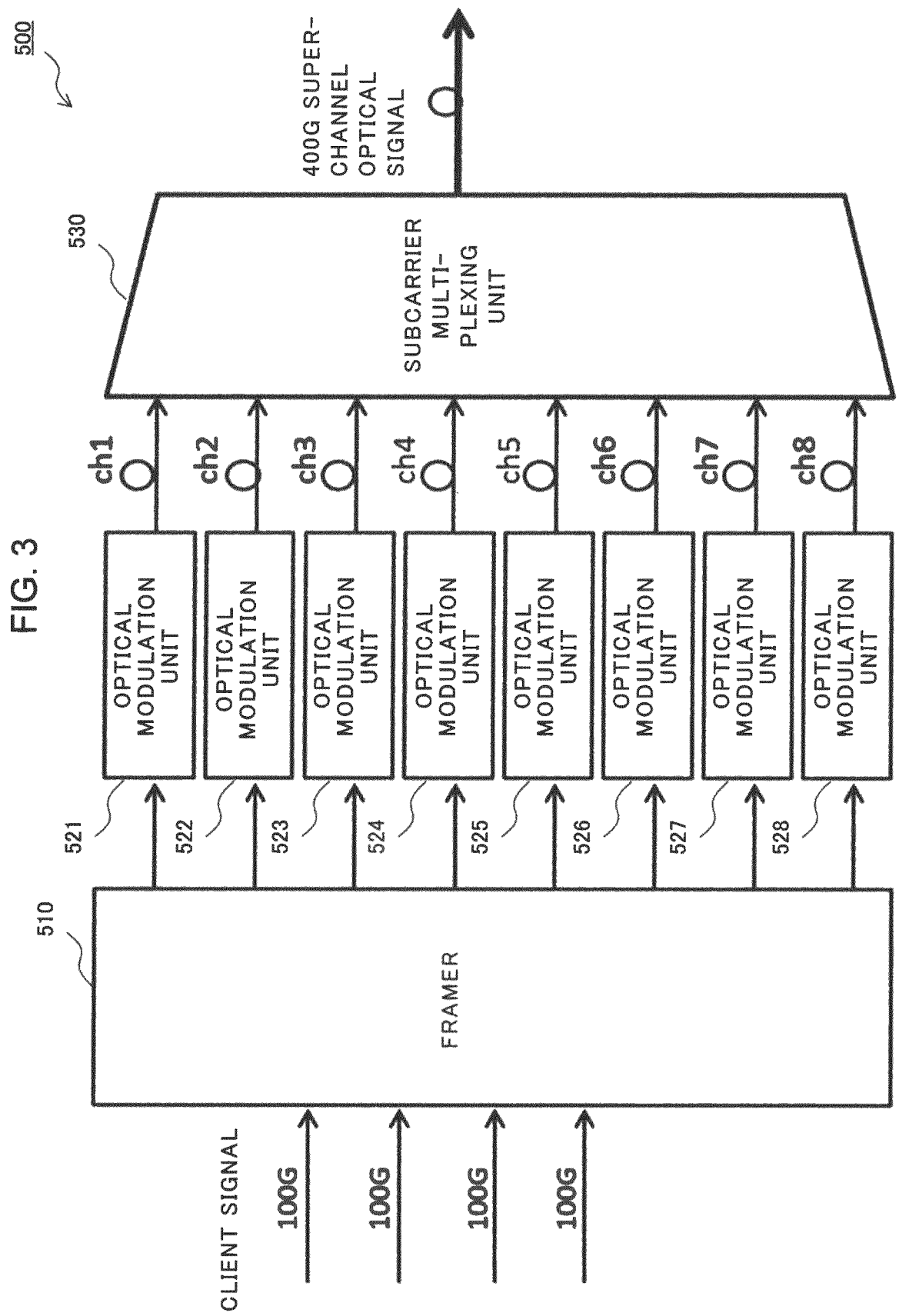
FIG. 3 is a block configuration diagram of a super-channel optical transmitter 500 according to the second example embodiment.

FIG. 3 illustrates a block configuration diagram of the super-channel optical transmitter 500. In the present example embodiment, α pieces of super-channel optical transmitters 500 are configured similarly to each other. As illustrated in FIG. 3, the super-channel optical transmitter 500 is composed of a framer 510, eight optical modulation units 521 to 528, and a subcarrier multiplexing unit 530. The super-channel optical transmitter 500 generates a 400G super-channel optical signal from four 100G client signals inputted from a transmission source, and outputs the 400G super-channel optical signal to the optical multiplexer 600. The super-channel optical transmitter 500 may receive input of plural sets of four 100G client signals and output a plurality of 400G super-channel optical signals.

The framer 510 performs a framing process, a process of adding error correction code and the like on the four 100G client signals inputted from the transmission source, and outputs an electrical main signal to each of the optical modulation units 521 to 528.

Each of the optical modulation units 521 to 528 has the function of generating one of subcarriers whose wavelengths differ from each other, modulates the generated subcarrier with the electrical main signal inputted from the framer 510, generates one of subcarrier optical signals whose wavelengths differ from each other, and outputs the subcarrier optical signal to the subcarrier multiplexing unit 530. Here, each of the optical modulation units 521 to 528 generates the subcarrier optical signal using one of 50G DP-BPSK modulation method and 100G DP-QPSK (dual polarization quadrature phase shift keying) modulation method. In the present example embodiment, in a normal state, each of the optical modulation units 521 to 528 outputs a subcarrier optical signal of a 50G DP-BPSK modulated signal using the 50G DP-BPSK modulation method.

The subcarrier multiplexing unit 530 multiplexes the subcarrier optical signals whose wavelengths differ from each other that have been inputted from the optical modulation units 521 to 528, and outputs a 400G super-channel optical signal to the optical multiplexer 600.

Figure 4:
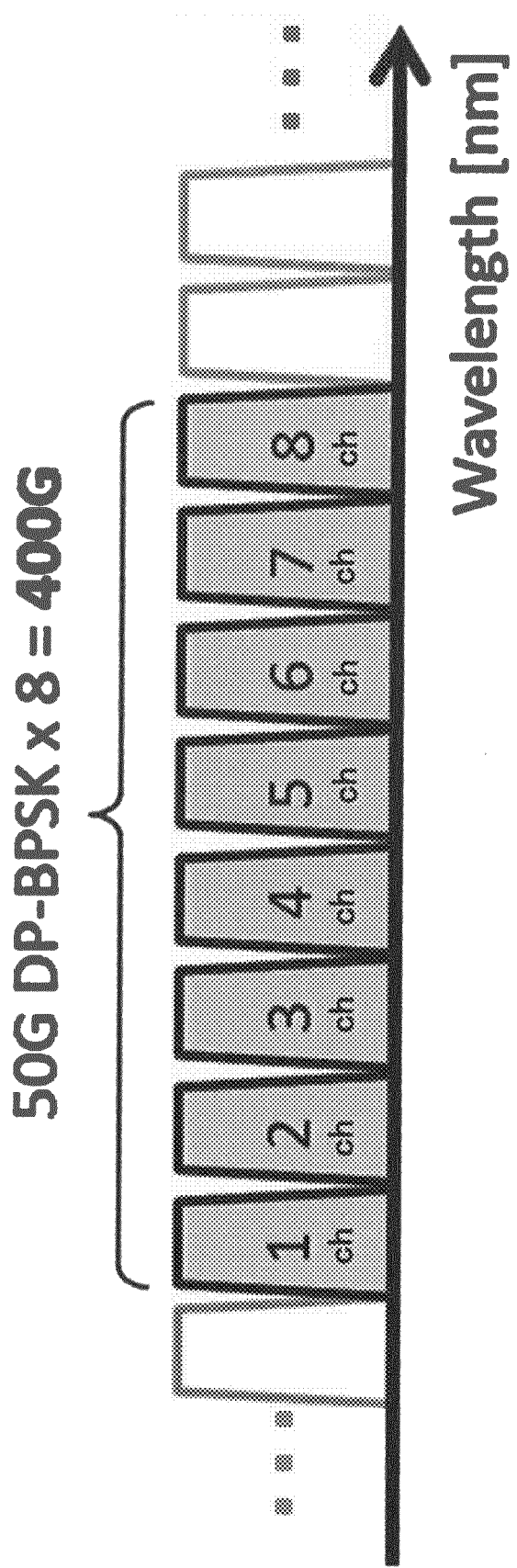
FIG. 4 is a wavelength configuration diagram of a super-channel optical signal output from a subcarrier multiplexing unit 530 according to the second example embodiment when operation is normally performed.

FIG. 4 illustrates a wavelength configuration diagram of a 400G super-channel optical signal output from the subcarrier multiplexing unit 530 when the optical transmission system 100 functions normally. As illustrated in FIG. 4, the optical modulation units 521 to 528 output the subcarrier optical signals of 50G DP-BPSK modulated signals whose center wavelengths differ from each other, and a 400G super-channel optical signal into which the subcarrier optical signals are multiplexed is output from the subcarrier multiplexing unit 530 to the optical multiplexer 600. Hereafter, if it is necessary to distinguish among the subcarrier optical signals that the optical modulation units 521 to 528 process, they are referred to as a channel-1 optical signal, a channel-2 optical signal, . . . and a channel-8 optical signal.

The optical multiplexer 600 multiplexes α pieces of 400G super-channel optical signals respectively inputted from the α pieces of super-channel optical transmitters 500, and transmits a wavelength-multiplexed optical signal. The wavelength-multiplexed optical signal transmitted from the optical multiplexer 600 is conveyed to a destination optical reception device through the optical fiber transmission line 300.

The optical reception device 400 includes an optical demultiplexer 700 and β pieces of super-channel optical receivers 800, demultiplexes the inputted wavelength-multiplexed optical signal into β pieces of signals, performs a digital coherent receiving process with respect to each 400G super-channel optical signal, and outputs client signals to transmission destinations.

The optical demultiplexer 700 demultiplexes the inputted wavelength-multiplexed optical signal into β pieces of signals, and outputs β pieces of 400G super-channel optical signals to β pieces of super-channel optical receivers 800 respectively.

Figure 5:
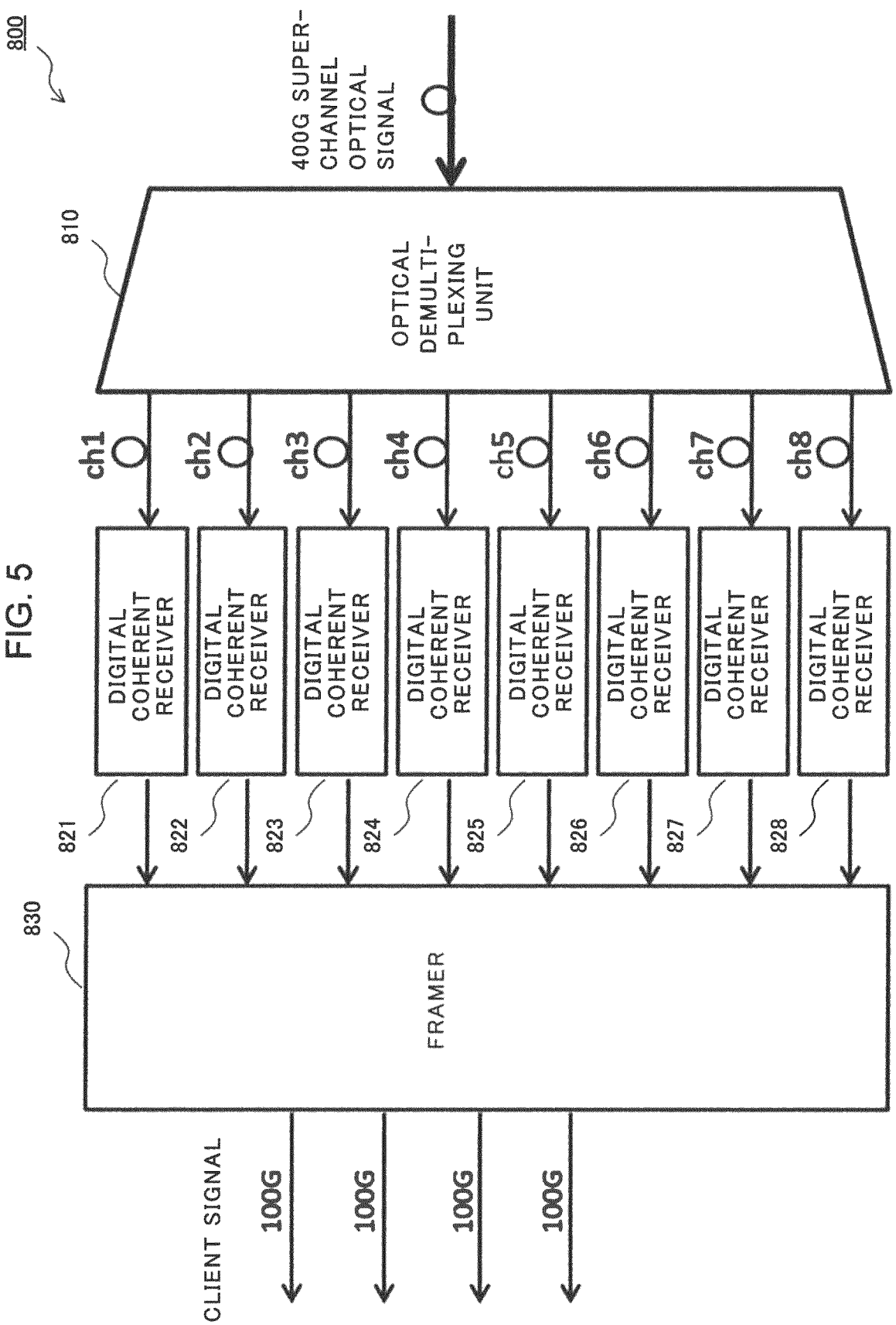
FIG. 5 is a block configuration diagram of a super-channel optical receiver 800 according to the second example embodiment.

FIG. 5 illustrates a block configuration diagram of the super-channel optical receiver 800. In the present example embodiment, β pieces of the super-channel optical receivers 800 are configured similarly to each other. As illustrated in FIG. 5, the super-channel optical receiver 800 is composed of an optical demultiplexing unit 810, eight digital coherent receivers 821 to 828, and a framer 830. The super-channel optical receiver 800 performs a digital coherent receiving process on the 400G super-channel optical signal inputted from the optical demultiplexer 700, and outputs four 100G client signals to a transmission destination. The super-channel optical receiver 800 may receive input of a plurality of 400G super-channel optical signals and output plural sets of four 100G client signals.

The optical demultiplexing unit 810 wavelength-demultiplexes the 400G super-channel optical signal inputted from the optical demultiplexer 700 into received optical signals so that each of the received optical signals may include the eight subcarrier optical signals whose center wavelengths differ from each other, and outputs the wavelength-demultiplexed received optical signals to the digital coherent receivers 821 to 828 respectively. Alternatively, the optical demultiplexing unit 810 can intensity-demultiplex the inputted 400G super-channel optical signal, and output intensity-demultiplexed received optical signals to the digital coherent receivers 821 to 828 respectively.

Each of eight digital coherent receivers 821 to 828 performs a digital coherent receiving process on the inputted received optical signal, outputs an electrical main signal to the framer 830. Specifically, each of the digital coherent receivers 821 to 828 converts detection results of the inputted received optical signal with local oscillator light into digital signals, performs an adaptive equalization process on the digital signals, and outputs a obtained electrical main signal to the framer 830.

The framer 830 collects the electrical main signals inputted from the digital coherent receivers 821 to 828, performs a mapping process on them, and outputs four 100G client signals to the transmission destination.

In the present example embodiment, the subcarrier multiplexing unit 530 is a component of the super-channel optical transmitter 500, and the optical demultiplexing unit 810 is a component of the super-channel optical receiver 800; however, the optical multiplexer 600 and the optical demultiplexer 700 can be made to have their functions.

The optical transmission system 100 configured as described above operates as follows while it normally functions. That is to say, in the optical transmission device 200, each of the α pieces of super-channel optical transmitters 500 performs 50G DP-BPSK modulation on subcarriers based on four 100G client signals inputted from the transmission source, and generates 400G super-channel optical signal illustrated in FIG. 4 by multiplexing the modulated subcarriers. Further, in the optical transmission device 200, the optical multiplexer 600 multiplexes α pieces of 400G super-channel optical signals and transmits a wavelength-multiplexed optical signal.

On the other hand, in the optical reception device 400, the optical demultiplexer 700 demultiplexes the inputted wavelength-multiplexed optical signal into β pieces of signals, and outputs β pieces of 400G super-channel optical signals to β pieces of the super-channel optical receivers 800 respectively. Each of β pieces of the super-channel optical receivers 800 wavelength-demultiplexes the 400G super-channel optical signal so that demultiplexed signals may include the subcarrier optical signals respectively, and performs a digital coherent receiving process on the demultiplexed signals. The super-channel optical receiver 800 further collects electrical main signals on which the digital coherent receiving process has been performed, maps them, restores them to four 100G client signals, and outputs the four 100G client signals to the transmission destination.

Figure 6:
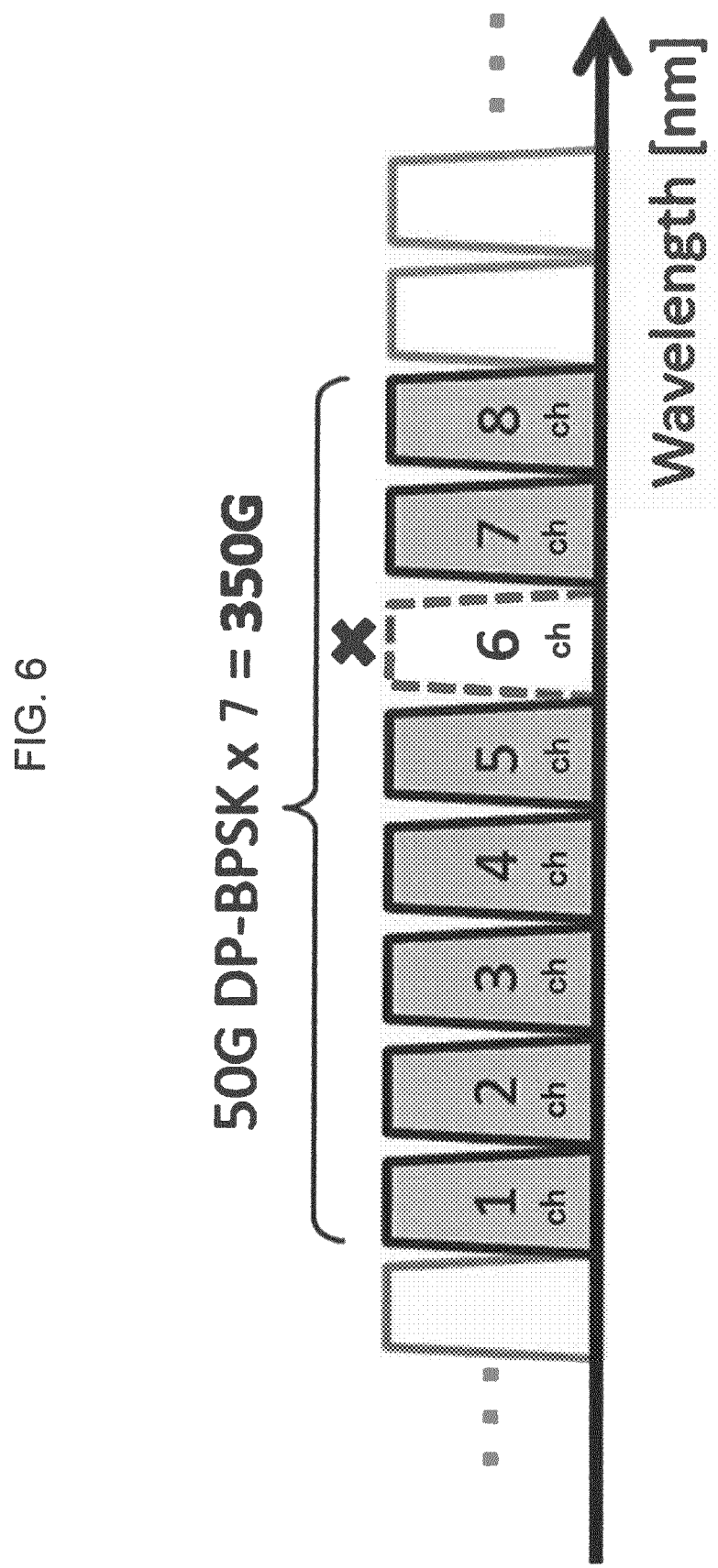
FIG. 6 is a wavelength configuration diagram of a super-channel optical signal when a channel-6 optical signal is lost.

Next, a description will be given of a case where, in the optical transmission system 100 according to the present example embodiment, a disruption of communication has occurred in one of eight channels of 50G DP-BPSK modulation signals that constitute any one of the 400G super-channel optical signals. FIG. 6 illustrates a wavelength configuration diagram of a super-channel optical signal while a failure has occurred in the function regarding the channel-6 optical signal, and the channel-6 optical signal has been lost. As illustrated in FIG. 6, as a result of the loss of the channel-6 optical signal, the possible transmission capacity of the super-channel optical signal decreases by 50 Gbps to 350 Gbps. In this case, a failure occurs in every one of four 100G client signals to be output from the optical reception device 400 to the transmission destination.

Figure 7:
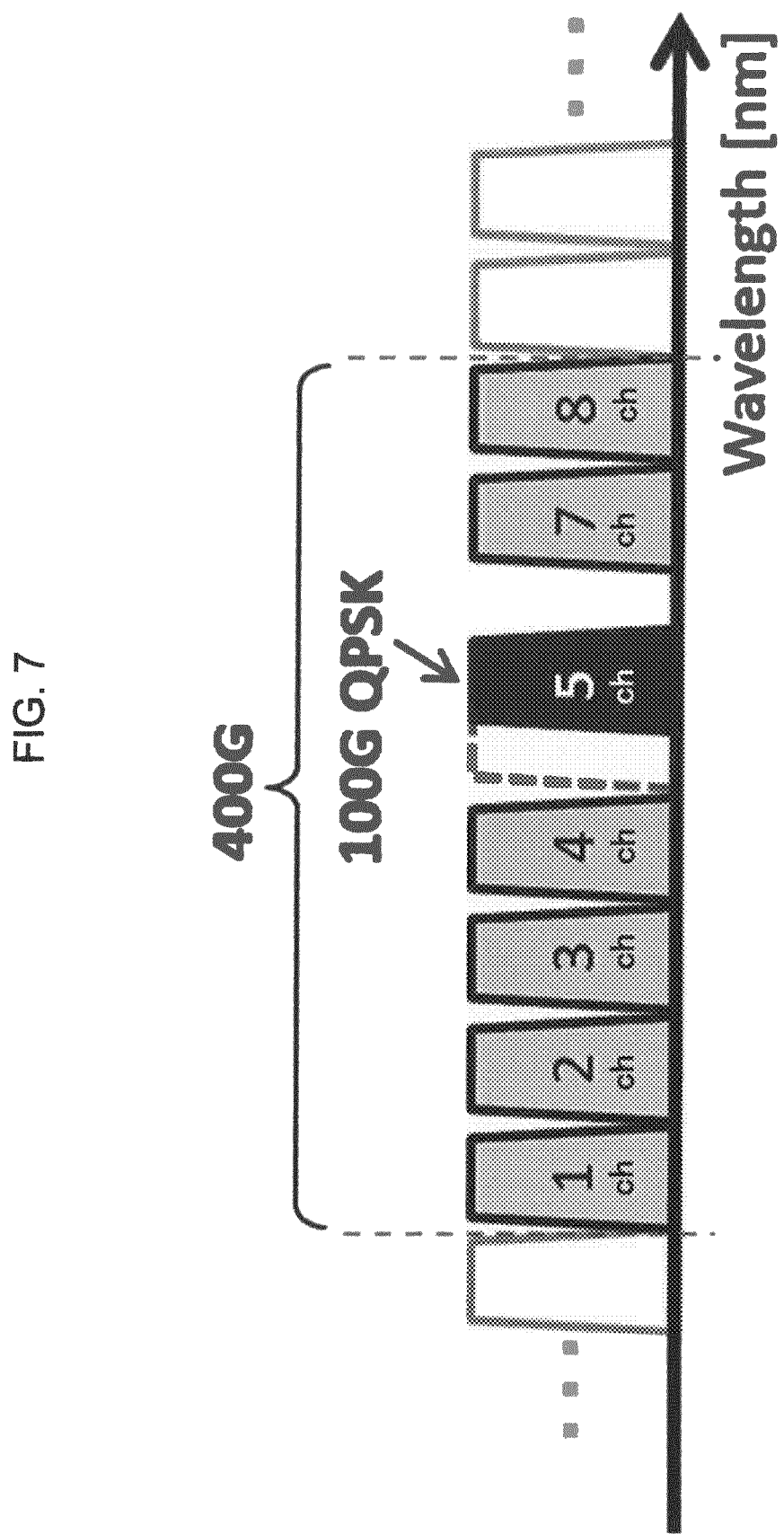
FIG. 7 is a wavelength configuration diagram of a super-channel optical signal output from the subcarrier multiplexing unit 530 according to the second example embodiment when the channel-6 optical signal is lost.

If a failure occurs in the function regarding the channel-6 optical signal, the optical transmission system 100 according to the present example embodiment, in order to prevent such failure from occurring in the 100G client signal, outputs a 400G super-channel optical signal with the wavelength configuration illustrated in FIG. 7 from the subcarrier multiplexing unit 530. The details will be described below.

If a failure occurs in the function regarding the channel-6 optical signal, the optical transmission device 200 controls a super-channel optical transmitter 500 in which the failure has occurred, and stops the optical output from optical modulation unit 526 that corresponds to the channel-6 optical signal subjected to the failure. In the super-channel optical transmitter 500 in which the failure has occurred, the framer 510 maps generated electrical main signals onto seven optical modulation units 521 to 525, 527, and 528 excluding the optical modulation unit 526. In addition, the super-channel optical transmitter 500 in which the failure has occurred shifts a wavelength of a source subcarrier of the channel-5 optical signal to a wavelength at the center between the channel-5 optical signal and the channel-6 optical signal, and also changes the modulation method of the optical modulation unit 525 from 50G DP-BPSK modulation to 100G DP-QPSK modulation.

Although the 100G DP-QPSK modulation gives double frequency utilization efficiency compared to that of the 50G DP-BPSK modulation, the bit rate is increased due to the change; consequently, the signal transmission quality deteriorates. In the present example embodiment, therefore, in changing the modulation method to 100G DP-QPSK modulation, a wavelength interval for the channel-5 optical signal is widened by shifting the wavelength of the channel-5 optical signal to a wavelength at the center between the channel-5 and channel-6 optical signals utilizing the wavelength band of the channel-6 optical signal that has been lost, which improves the signal quality of the channel-5 optical signal.

In the super-channel optical transmitter 500 in which the failure occurs, the subcarrier multiplexing unit 530 multiplexes DP-BPSK modulated 50G optical signals output from the optical modulation units 521 to 524, 527, and 528 and the DP-QPSK modulated 100G optical signal output from the optical modulation unit 525, and outputs a 400G super-channel optical signal illustrated in FIG. 7 to the optical multiplexer 600.

On the other hand, the optical reception device 400 stops the output from the digital coherent receiver 826 by controlling the super-channel optical receiver 800 into which the 400G super-channel optical signal illustrated in FIG. 7 is inputted. Then the super-channel optical receiver 800 into which the 400G super-channel optical signal illustrated in FIG. 7 is inputted demultiplexes the inputted 400G super-channel optical signal illustrated in FIG. 7 into seven signals, coordinating the distribution of them, and outputs received optical signals to the digital coherent receivers 821 to 825, 827, and 828 other than the digital coherent receiver 826. The received optical signals on which a digital coherent receiving process has been performed in the digital coherent receivers 821 to 825, 827, and 828 are collected and mapped in the framer 830; consequently, they are restored to four 100G client signals and output to the transmission destination.

As described above, if a failure occurs in the function regarding any subcarrier optical signal, the optical transmission system 100 according to the present example embodiment changes the modulation method of the optical modulation unit corresponding to a subcarrier optical signal that operates normally into a modulation method with a higher frequency efficiency, thereby increases the bit rate, also restructures the distribution of electrical main signals to each subcarrier, and makes the super-channel optical signal restored. This makes the transmission capacity of the super-channel optical signal promptly return to that in the normal state, and the signal continuity for client signals restored.

In addition, the optical transmission system 100 according to the present example embodiment widens a wavelength interval of the subcarrier optical signal whose modulation method is changed, utilizing a wavelength region becoming empty due to the above operations, and improves the signal quality of the subcarrier optical signal whose modulation method has been changed. This makes it possible, in a system demanding for transmission characteristics and the like, to widen a wavelength interval around a subcarrier whose modulation method has been changed and relieve a decrease in signal quality.

It is only necessary for the optical transmission system 100 according to the present example embodiment to change the functions of the optical modulation unit and the digital coherent receiver that are used in normal operation in maintaining the transmission capacity and restoring the signal continuity in case of failure, and unnecessary to use a new light source. That is to say, it is unnecessary to implement a backup light source in advance. Accordingly, the optical transmission system 100 according to the present example embodiment is capable of continuing the transmission and reception of super-channel optical signals maintaining the possible transmission capacity without providing a redundant configuration in advance even though a failure occurs in a function regarding any subcarrier optical signal.

Figure 8:
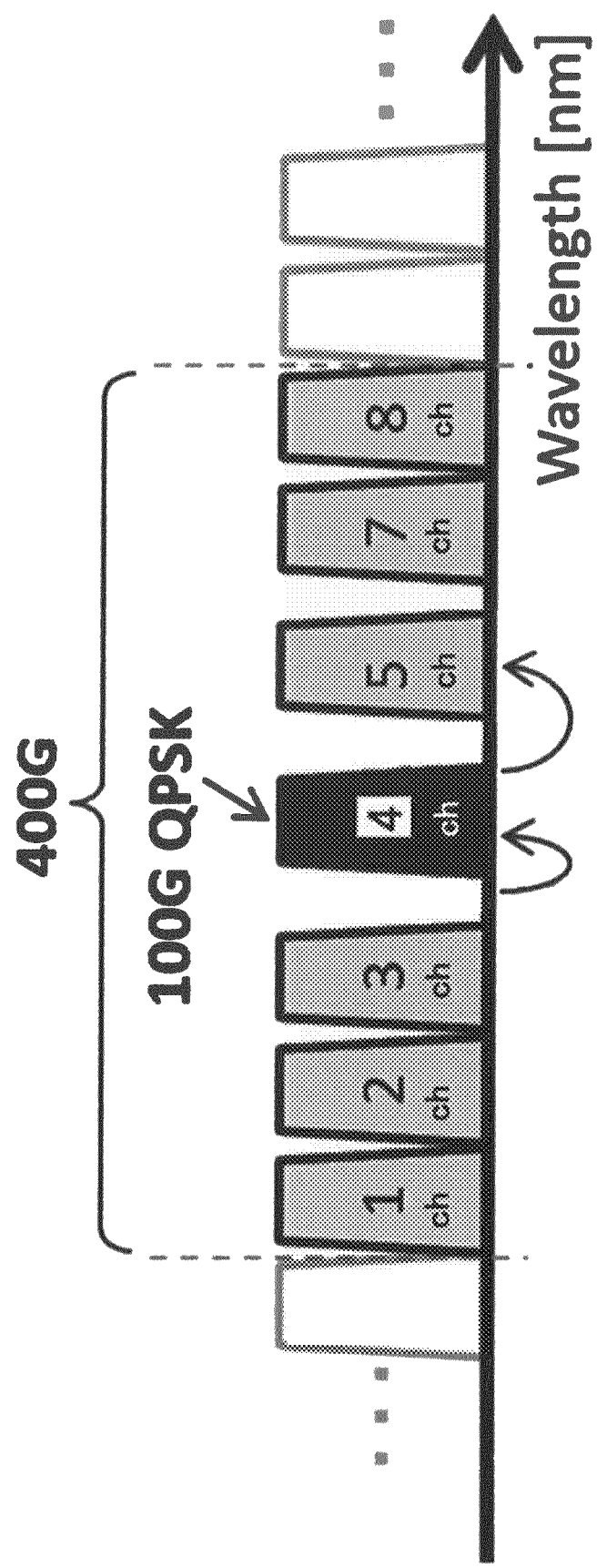
FIG. 8 is a wavelength configuration diagram of a super-channel optical signal when a process on a channel-4 optical signal is changed in the case the-channel 6 optical signal is lost.

The optical transmission system 100 according to the present example embodiment changes the processing for a channel-5 optical signal adjacent to the channel-6 optical signal in which a failure has occurred when a channel-6 optical signal has lost; however, the processing for an optical signal in a non-adjacent channel can be changed. FIG. 8 illustrates a wavelength configuration diagram of a 400G super-channel optical signal in the case of changing the processing for a channel-4 optical signal when the channel-6 optical signal has lost.

In FIG. 8, in addition to shifting center wavelengths of source subcarriers of the channel-4 and channel-5 optical signals so as to be located at regular intervals within the wavelength region raging from channel-3 optical signal to channel-7 optical signal, the modulation method of the optical modulation unit 524 is changed from 50G DP-BPSK modulation to 100G DP-QPSK modulation. In that case again, it is possible to continue the transmission and reception of a super-channel optical signal maintaining the possible transmission capacity without providing a redundant configuration in advance.

Here, the bit rate of client signals, the number of client signals, the bit rate of super-channel optical signal, the modulation methods in the optical modulation units 521 to 528, the bit rate of subcarrier optical signal, the number of subcarriers and the like can be changed appropriately.

<Third Example Embodiment>

A third example embodiment will be described below. Although the processing in a case where a failure occurs in a function regarding an optical signal in one channel is described in the second example embodiment, a case will be described in the present example embodiment where failures occur in functions regarding optical signals in plural channels. The case will be described below where failures occur in the function regarding a channel-5 optical signal and the function regarding a channel-6 optical signal.

Figure 9:
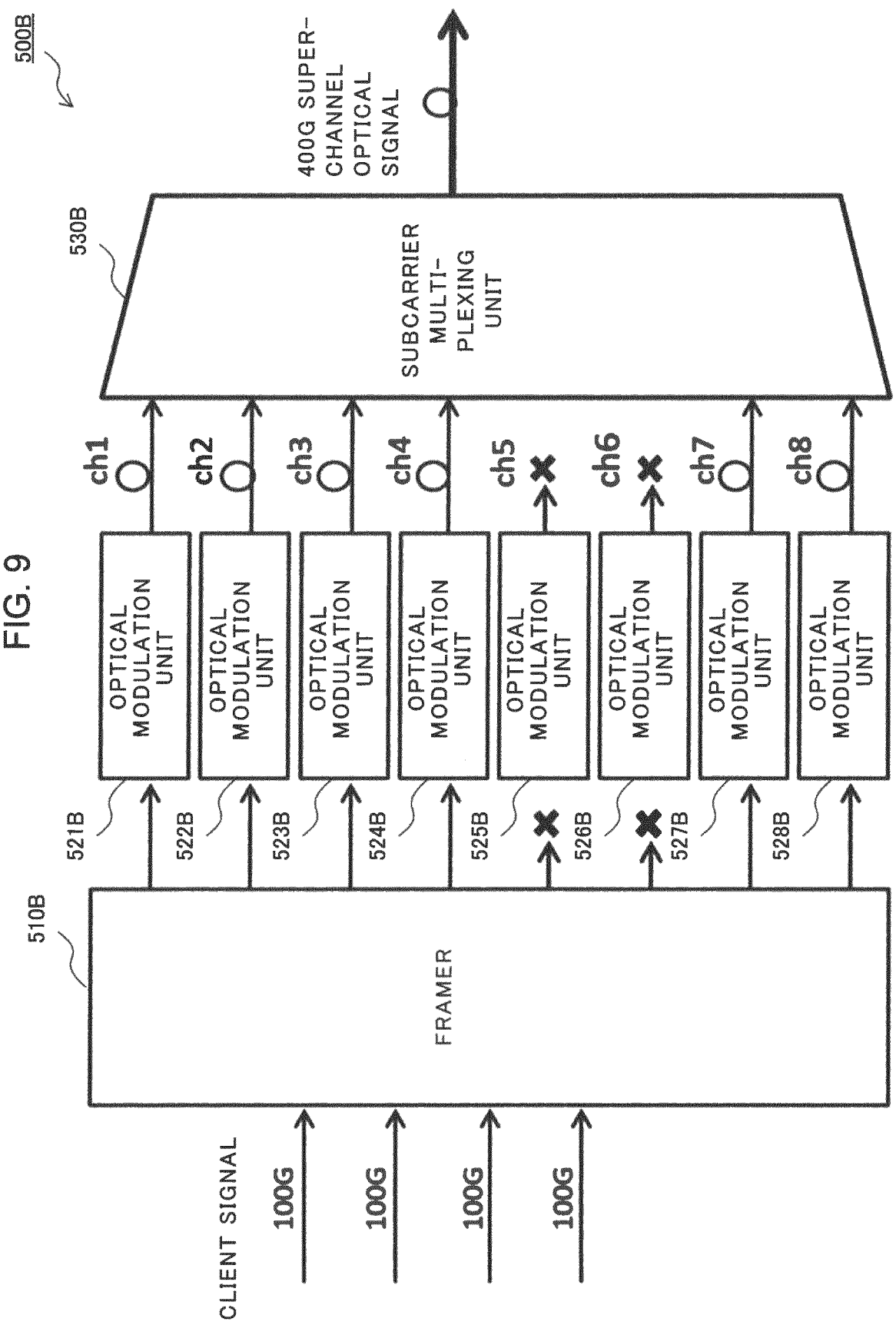
FIG. 9 is a diagram illustrating an operational state of a super-channel optical transmitter 500B according to a third example embodiment.
Figure 10:
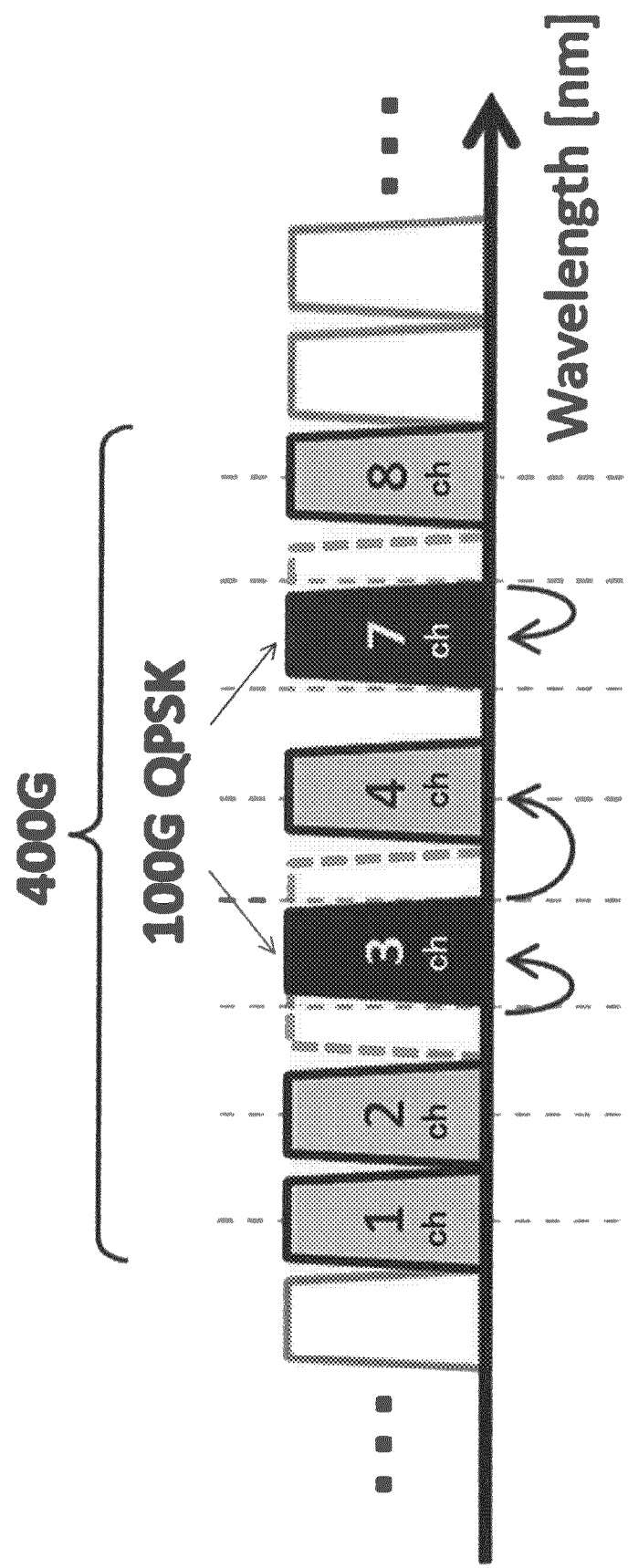
FIG. 10 is a wavelength configuration diagram of a super-channel optical signal output from a subcarrier multiplexing unit 530B according to the third example embodiment when a channel-5 optical signal and a channel-6 optical signal are lost.

FIG. 9 illustrates an operational state of a super-channel optical transmitter 500B in that case, and FIG. 10 illustrates a wavelength configuration diagram of a 400G super-channel optical signal output from a subcarrier multiplexing unit 530B.

If failures occur in the function regarding the channel-5 optical signal and the function regarding the channel-6 optical signal, the super-channel optical transmitter 500B according to the present example embodiment stops the optical output from optical modulation units 525B and 526B corresponding to the channel-5 optical signal and channel-6 optical signal in which the failures occurs, and maps generated electrical main signals onto six optical modulation units 521B to 524B, 527B, and 528B. In addition, the super-channel optical transmitter 500B shifts center wavelengths of source subcarriers of the channel-3, channel-4, and channel-7 optical signals so as to be located at regular intervals within the wavelength region raging from the channel-2 optical signal to channel-8 optical signal, and changes each modulation method of the optical modulation units 523B and 527B from 50G DP-BPSK modulation to 100G DP-QPSK modulation.

As a result, it is possible to restore the super-channel optical signal promptly even though failures occur in the functions regarding plural channel optical signals.

As mentioned earlier, although the 100G DP-QPSK modulation gives double frequency utilization efficiency compared to that of the 50G DP-BPSK modulation, the bit rate is increased due to the change; consequently, the signal transmission quality deteriorates. In this respect, for example, adding pre-emphasis or adjusting the bit rate makes it possible to improve the signal transmission quality of the 400G super-channel optical signal output from the subcarrier multiplexing unit 530B.

Figure 11:
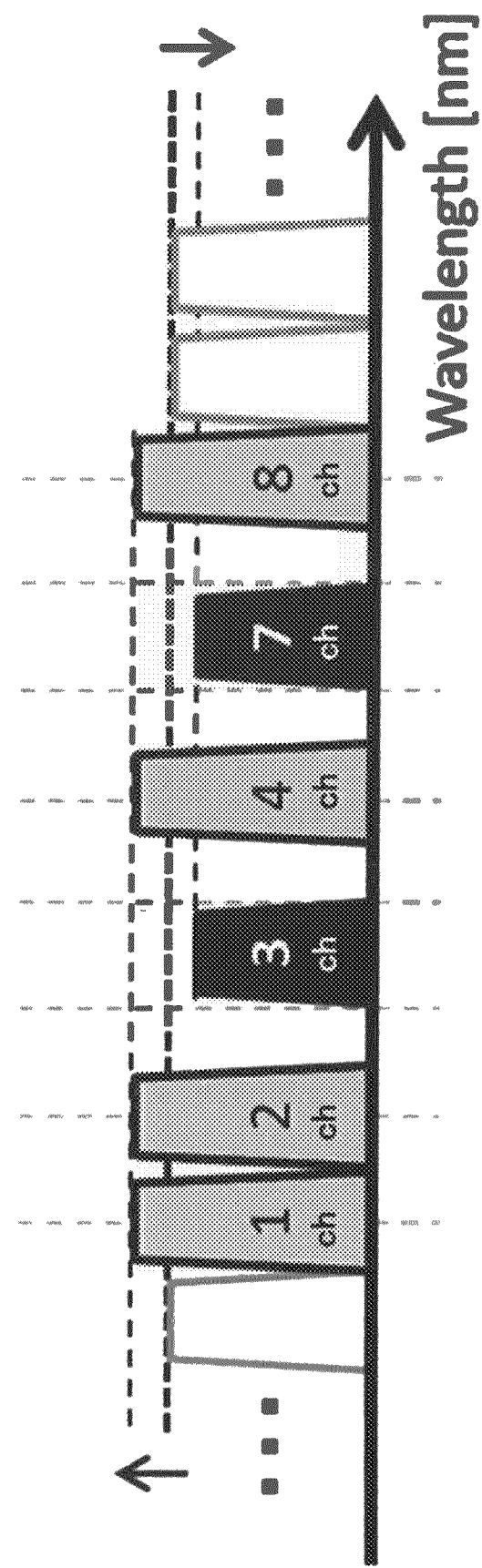
FIG. 11 is a wavelength configuration diagram of a super-channel optical signal output from the subcarrier multiplexing unit 530B according to the third example embodiment when pre-emphasis is applied.

That is to say, the intensity level of 100G DP-QPSK modulated signal and the intensity level of 50G DP-BPSK modulated signal are adjusted so that each intensity level may become a desired level in the 400G super-channel optical signal, which improves the signal quality of the 400G super-channel optical signal. Specifically, if the channel-3 and channel-7 optical signals whose modulation methods have been changed are affected significantly by non-linear degradation in the transmission line, each of the optical modulation units 521B to 525B, 527B, and 528B or the subcarrier multiplexing unit 530B adds pre-emphasis so that the intensity levels of the channel-3 and channel-7 optical signals may become smaller than those of the other channel optical signals. FIG. 11 illustrates a wavelength configuration diagram of a 400G super-channel optical signal output from the subcarrier multiplexing unit 530B in that case. In FIG. 11, the non-linear degradation is relieved that the channel-3 and channel-7 optical signals are subjected to, which makes the transmission quality of the 400G super-channel optical signal improved. If the main signal quality deteriorates in the channel-3 and channel-7 optical signals due to a deficiency of OSNR (optical signal-to-noise ratio), pre-emphasis is added so that the intensity levels of the channel-3 and channel-7 optical signals may become larger than those of the other channel optical signals, which improves the performance of the channel-3 and channel-7 optical signals and the transmission quality of the 400G super-channel optical signal.

On the other hand, it is also possible to improve the transmission quality of the 400G super-channel optical signal by reducing bit rates of the channel-3 and channel-7 and distributing decreases in bit rates to the other channels. In this case, whereas the signal quality of the other channels is decreased, the signal quality of the channel-3 and channel-7 improves; consequently, the signal quality of each channel is averaged. For example, if there is a great difference in characteristics between the channel-3 and channel-7 optical signals and the other channel optical signals, and the signal characteristics of the channels 3 and 7 fall below an FEC (forward error correction) limit, that is to say, if the channels 3 and 7 have transmission characteristics causing signal discontinuity, by distributing the bit rates of the channels 3 and 7 to the other channels, the transmission characteristics of the channels 3 and 7 are improved up to a level at which the signal continuity can be achieved in addition to lowering the transmission quality of the other channels with acceptable level. With regard to an optical spectrum of each channel, because its spectrum width varies with the bit rate changing, the spectrum width can be changed so that the wavelength allocation of each subcarrier may be optimized.

The addition of the pre-emphasis and the adjustment of the bit rate mentioned above can be also applied to a process for a case where a failure occurs in a function regarding one channel optical signal and to a process for a case where failures occur in functions regarding three or more channel optical signals, and further, a combination of both can be also applied. In the above-mentioned example embodiments, by programming in advance the process of distributing electrical main signals and the process of adding pre-emphasis at the framers, depending on channel numbers or the number of subcarrier optical signals in which failures have occurred, and storing the programs in the super-channel optical transmitter and the super-channel optical receiver, it is possible to perform automatic restoration promptly on the occurrence of a failure.

The present invention has been described above taking the above-mentioned example embodiments as exemplary examples. However, the present invention is not limited to the above-mentioned example embodiments. That is to say, various modes which would be understood by those skilled in the art are applicable to the present invention within the scope of the present invention.

REFERENCE SIGNS LIST 10 optical transmitter
20 splitting means
31 to 3N optical modulation means
40 multiplexing means
50 control means
100 optical transmission system
200 optical transmission device
300 optical fiber transmission line
310 optical amplifying device
320 optical cable
400 optical reception device
500 super-channel optical transmitter
510 framer
521 to 528 optical modulation unit 530 subcarrier multiplexing unit
600 optical multiplexer
700 optical demultiplexer
800 super-channel optical receiver
810 optical demultiplexing unit
821 to 828 digital coherent receiver
830 framer

The invention claimed is:

1. An optical transmitter, comprising:
a splitter configured to output a plurality of split signals split from a client signal;
a plurality of modulators configured to be capable of modulating and outputting a plurality of subcarriers having different wavelengths by using the split signals;
a multiplexer configured to multiplex the split signals modulated; and
a controller configured to control the modulators and the multiplexer;
wherein the controller is configured to, if a failure occurs in a first modulator of the modulators, then:
control the splitter to output the split signal, which was outputted to the first modulator, to a second modulator of the modulators, wherein the failure has not occurred in the second modulator;
raise a bit rate of a first subcarrier outputted from the second modulator; and
shift a wavelength of the first subcarrier, and
wherein the controller is configured to shift the wavelength of the first subcarrier toward a subcarrier which used to be outputted from the first modulator.

2. The optical transmitter according to claim 1, wherein the controller is configured to stop an output from the first modulator.

3. The optical transmitter according to claim 2, wherein the first modulator is configured to modulate a subcarrier by a first modulation method,
wherein the controller is configured to control the second modulator to raise the bit rate of the first subcarrier by modulating the subcarrier using a second modulation method with a higher frequency efficiency than the first modulation method, and
wherein the splitter is configured to pretreat the split signals so that a larger portion of the client signals may be inputted into the first modulator to which the first modulation method is applied than the second modulator to which the second modulation method is applied.

4. The optical transmitter according to claim 2, wherein the multiplexer is configured to output a super-channel signal which is obtained by multiplexing the first subcarrier and a subcarrier with a higher intensity level than intensity of the first subcarrier.

5. The optical transmitter according to claim 1, wherein the first modulator is configured to modulate a subcarrier by a first modulation method,
wherein the controller is configured to control the second modulator to raise the bit rate of the first subcarrier by modulating the first subcarrier using a second modulation method with a higher frequency efficiency than the first modulation method, and
wherein the splitter is configured to pretreat the split signals so that a larger portion of the split signals may be inputted into the first modulator to which the first modulation method is applied than the second modulator to which the second modulation method is applied.

6. The optical transmitter according to claim 5, wherein the multiplexer is configured to output a super-channel signal which is obtained by multiplexing the first subcarrier and a subcarrier with a higher intensity level than intensity of the first subcarrier.

7. The optical transmitter according to claim 1, wherein the multiplexer is configured to output a super-channel signal which is obtained by multiplexing the first subcarrier and a subcarrier with a higher intensity level than intensity of the first subcarrier.

8. An optical transmission device, comprising:
a plurality of optical transmitters, each of which are according to claim 1; and
an optical multiplexer configured to multiplex super-channel optical signals output from the plurality of optical transmitters and transmit a wavelength-multiplexed optical signal.

9. The optical transmission device according to claim 8, wherein the controller is configured to stop an output from the first modulator.

10. The optical transmission device according to claim 8, wherein the modulator is configured to modulate a subcarrier by a first modulation method,
wherein the controller is configured to control the second modulator to raise the bit rate of the first subcarrier by modulating the first subcarrier using a second modulation method with a higher frequency efficiency than the first modulation method, and
wherein the splitter is configured to pretreat the split signals so that a larger portion of the split signals may be inputted into the first modulator to which the first modulation method is applied than the second modulator to which the second modulation method is applied.

11. The optical transmission device according to claim 8, wherein the multiplexer is configured to output a super-channel signal which is obtained by multiplexing the first subcarrier and a subcarrier with a higher intensity level than intensity of the first subcarrier.

12. An optical transmission/reception system, comprising:
an optical transmission device configured to transmit a wavelength-multiplexed optical signal; and
an optical receiver configured to receive the wavelength-multiplexed optical signal, on which to perform digital coherent processing, and restore and output a plurality of client signals,
wherein the optical transmission device includes:
a plurality of optical transmitters, each of which including:
a splitter configured to output a plurality of split signals split from a client signal;
a plurality of modulators configured to be capable of modulating and outputting a plurality of subcarriers having different wavelengths by using the split signals;
a multiplexer configured to multiplex the split signal modulated; and
a controller configured to control the modulators and the multiplexer;
wherein the controller is configured to, if a failure occurs in a first modulator of the modulators, then:
control the splitter output the split signal, which was outputted to the first modulator, to a second modulator of the modulators, wherein the failure has not occurred in the second modulator;
raise a bit rate of a first subcarrier outputted from the second modulator; and shift a wavelength of the first subcarrier, and
wherein the controller is configured to shift the wavelength of the first subcarrier toward a subcarrier which used to be outputted from the first modulator.

13. The optical transmission/reception system according to claim 12, wherein the optical receiver includes:
   an optical demultiplexer configured to demultiplex the wavelength-multiplexed optical signal having been received, and output a plurality of super-channel optical signals; and
   a plurality of optical receivers configured to restore output super-channel optical signals to a plurality of client signals by performing a reception process on output super-channel optical signals,
   wherein each of the plurality of optical receivers includes:
      a demultiplexer configured to demultiplex the super-channel optical signal into M pieces of received optical signals including subcarriers respectively and output the received optical signals;
      M pieces of receptors configured to perform a reception process on output received optical signals respectively; and
      a restorator configured to restore M pieces of received optical signals on which the reception process having been performed to the client signal.

14. The optical transmission/reception system according to claim 13, wherein each of the M pieces of receptors are configured to perform a digital coherent receiving process on each of the output received optical signals.

15. An optical transmission method, using an optical transmitter including a plurality of modulators, the optical transmission method comprising:
   outputting a split signal split from a client signal;
   modulating and outputting a plurality of subcarriers having different wavelengths by using the split signals;
   multiplexing the subcarriers modulated; and
   if a failure occurs in a first modulator of the modulators, then:
      outputting the split signal, which was outputted to the first modulator, to a second modulator of the modulators, wherein the failure has not occurred in the second modulator;
      raising a bit rate of a first subcarrier outputted from the second modulator; and
      shifting a wavelength of the first subcarrier,
   wherein the shifting the wavelength of the first subcarrier comprises shifting the wavelength of the first subcarrier toward a subcarrier which used to be outputted from the first modulator.

* * * * *